US 9,458,612 B2

(12) United States Patent
Thomas et al.

(10) Patent No.: US 9,458,612 B2
(45) Date of Patent: Oct. 4, 2016

(54) INTEGRATED SOLENOID VALVE FOR AN ELECTRONIC FAUCET

(71) Applicant: Delta Faucet Company, Indianapolis, IN (US)

(72) Inventors: Kurt J. Thomas, Indianapolis, IN (US); Derek A. Brown, Lizton, IN (US); Joel D. Sawaski, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 398 days.

(21) Appl. No.: 13/837,052

(22) Filed: Mar. 15, 2013

(65) Prior Publication Data
US 2014/0261780 A1    Sep. 18, 2014

(51) Int. Cl.
*E03C 1/05*    (2006.01)
*F16K 31/08*   (2006.01)
*F16K 31/40*   (2006.01)

(52) U.S. Cl.
CPC ........... *E03C 1/057* (2013.01); *F16K 31/082* (2013.01); *F16K 31/402* (2013.01); *Y10T 137/7737* (2015.04); *Y10T 137/9464* (2015.04)

(58) Field of Classification Search
CPC .... F16K 21/00; F16K 31/402; F16K 31/082; E03C 1/057; Y10T 137/9464; Y10T 137/7737
USPC .................. 251/129.04; 4/623, 628; 137/801
See application file for complete search history.

(56) References Cited

U.S. PATENT DOCUMENTS

| | | | |
|---|---|---|---|
| 4,102,526 A | 7/1978 | Hargraves | |
| 4,606,085 A * | 8/1986 | Davies | E03C 1/052 4/628 |
| 4,898,360 A | 2/1990 | VonHayn | |
| 4,915,347 A * | 4/1990 | Iqbal | E03C 1/057 251/129.04 |
| 5,092,560 A * | 3/1992 | Chen | F16K 31/055 4/623 |
| 5,199,118 A * | 4/1993 | Cole | A47K 1/04 4/628 |
| 5,481,237 A | 1/1996 | Sarfati et al. | |
| 5,584,466 A | 12/1996 | Fukano et al. | |
| 5,603,355 A | 2/1997 | Miyazoe et al. | |
| 5,625,908 A * | 5/1997 | Shaw | E03C 1/057 4/628 |
| 5,699,833 A * | 12/1997 | Tsataros | E03C 1/057 251/129.04 |
| 5,765,242 A * | 6/1998 | Marciano | E03C 1/057 4/628 |
| 5,911,240 A * | 6/1999 | Kolar | E03C 1/04 137/801 |

(Continued)

FOREIGN PATENT DOCUMENTS

CN    202432111    9/2012
EP    0376894      7/1990

(Continued)

*Primary Examiner* — John Bastianelli
(74) *Attorney, Agent, or Firm* — Faegre Baker Daniels, LLP

(57) ABSTRACT

An electronic faucet is provided comprising a spout; a fluid supply conduit supported by the spout; a valve assembly including a solenoid valve positioned to control fluid flow through the fluid supply conduit, the solenoid valve including a solenoid coil and a moveable valve member operably coupled to the solenoid coil; and a controller operative to control the solenoid valve, the controller including a circuit board coupled to the valve assembly and a processor mounted to the circuit board to control the solenoid valve, the solenoid coil being mounted to the circuit board.

27 Claims, 10 Drawing Sheets

(56) References Cited

U.S. PATENT DOCUMENTS

| | | | |
|---|---|---|---|
| 5,915,417 A * | 6/1999 | Diaz | E03C 1/057 4/623 |
| 5,941,282 A | 8/1999 | Suzuki et al. | |
| 5,979,493 A * | 11/1999 | Simpkins, Jr. | F16K 17/20 137/624.11 |
| 5,988,588 A * | 11/1999 | Allen | E03C 1/055 251/129.04 |
| 5,988,772 A | 11/1999 | Hashida | |
| 5,992,461 A | 11/1999 | Gilmore et al. | |
| 6,098,653 A | 8/2000 | Kobow | |
| 6,164,323 A | 12/2000 | Smith et al. | |
| 6,336,818 B1 | 1/2002 | Bayer | |
| 6,382,257 B2 | 5/2002 | Mead et al. | |
| 6,786,238 B2 | 9/2004 | Frisch | |
| 6,863,254 B2 | 3/2005 | Altenrenger et al. | |
| 7,011,113 B2 | 3/2006 | Gandrud | |
| 7,201,154 B2 | 4/2007 | Veinotte et al. | |
| 7,228,874 B2 | 6/2007 | Bolderheij et al. | |
| 7,377,290 B2 | 5/2008 | Albert et al. | |
| 7,701,314 B2 | 4/2010 | Hazzard et al. | |
| 7,798,174 B2 | 9/2010 | Ford et al. | |
| 8,197,610 B2 | 6/2012 | Rosenbauer et al. | |
| 2001/0048244 A1 | 12/2001 | Altenrenger et al. | |
| 2002/0166986 A1 * | 11/2002 | Remby | A01G 25/16 251/129.04 |
| 2008/0203339 A1 | 8/2008 | Kato et al. | |
| 2009/0094740 A1 * | 4/2009 | Ji | E03C 1/057 4/623 |
| 2010/0108165 A1 | 5/2010 | Rodenbeck et al. | |
| 2012/0055557 A1 | 3/2012 | Belz et al. | |
| 2012/0112107 A1 | 5/2012 | Da Pont et al. | |

FOREIGN PATENT DOCUMENTS

| | | |
|---|---|---|
| EP | 0650002 | 4/1995 |
| EP | 0687817 | 12/1995 |
| EP | 0832801 | 4/1998 |
| EP | 1160806 | 12/2001 |
| EP | 1371888 | 12/2003 |
| EP | 1508731 | 2/2005 |
| EP | 1518030 | 3/2005 |
| EP | 1528282 | 5/2005 |
| EP | 1699967 | 9/2006 |
| EP | 1903581 | 3/2008 |
| EP | 2438334 | 12/2010 |
| JP | 1199075 | 8/1989 |
| JP | 3437265 | 1/1996 |
| JP | 10132122 | 5/1998 |
| JP | 3250488 | 6/1998 |
| JP | 2002043121 | 2/2002 |
| JP | 2607670 | 3/2002 |
| JP | 4665226 | 3/2005 |
| JP | 4310548 | 9/2008 |
| WO | WO9821511 | 5/1998 |
| WO | WO2004001142 | 12/2003 |
| WO | WO2005061776 | 7/2005 |
| WO | WO2010140096 | 12/2010 |

* cited by examiner

INTEGRATED SOLENOID VALVE FOR AN ELECTRONIC FAUCET

BACKGROUND AND SUMMARY

The present disclosure relates generally to a fluid delivery apparatus. More particularly, the present disclosure relates to an integrated solenoid valve assembly for an electronic faucet.

Electronic faucets typically include a solenoid valve controlled by an electronic controller for controlling fluid flow. Some electronic faucets include proximity sensors such as active infrared ("IR") proximity detectors or capacitive proximity sensors to control operation of the solenoid valve. Such proximity sensors are used to detect a user's hands positioned near the faucet and to automatically start fluid flow through the faucet in response to detection of the user's hands. Other electronic faucets use touch sensors to control the faucet.

The electronic controller is typically located away from the solenoid valve, and electrical wires are routed between the solenoid valve and the electronic controller for controlling the solenoid valve. Additional wire terminations are often made between the solenoid valve and the electronic controller depending on the configuration of the faucet system. The wiring and associated wire connections add cost to the electronic faucet as well as additional circuit components susceptible to damage or failure.

Some electronic faucets include temperature sensors positioned within the solenoid valve housing to detect the temperature of the water in the housing. The temperature sensor is often encapsulated in an epoxy-filled casing, and the casing is sealed and placed in the waterway of the valve housing. A wire is routed from the temperature sensor in the casing to the controller outside of solenoid valve housing. The sensor casing and wiring interfaces are often susceptible to damage and/or leaking, thereby damaging the temperature sensor and wiring. Further, the encapsulated sensor, the routed wiring, and associated wire connections add cost and complexity to the electronic faucet.

In bathrooms and kitchens with multiple electronic faucets and/or other dispensing devices, each dispensing device includes a controller for controlling the respective device. Such a system is costly due to the multiple processors and other control electronics required to control each dispensing device.

According to an illustrative embodiment of the present disclosure, an electronic faucet is provided including a spout, a fluid supply conduit supported by the spout, and a valve assembly. The valve assembly includes a solenoid valve positioned to control fluid flow through the fluid supply conduit. The solenoid valve includes a solenoid coil and a moveable valve member operably coupled to the moveable valve member. The faucet further includes a controller operative to control the solenoid valve. The controller includes a circuit board coupled to the valve assembly and a processor mounted to the circuit board to control the solenoid valve. The solenoid coil is mounted to the circuit board.

According to another illustrative embodiment of the present disclosure, an electrically operable valve assembly for an electronic faucet is provided. The valve assembly includes a valve housing having an interior region for receiving a fluid. The valve assembly further includes a solenoid valve, a temperature sensor positioned outside the interior region, and a heat transfer device. The heat transfer device extends between the temperature sensor and the interior region to transfer heat from fluid in the interior region to the temperature sensor. The valve assembly further includes a controller in communication with the temperature sensor. The controller is operative to control the solenoid valve.

According to yet another illustrative embodiment of the present disclosure, an electronic faucet is provided. The faucet includes a spout, a fluid supply conduit supported by the spout, and a valve assembly including an electrically operable valve positioned to regulate fluid flow through the fluid supply conduit. The faucet includes a controller coupled to the valve assembly. The controller includes a processor operative to control the electrically operable valve to control fluid flow through the fluid supply conduit. The controller includes a port in communication with the processor. The port is releasably coupled to electronics of a secondary dispensing device. The controller is operative to at least one of control and power the electronics of the secondary dispensing device via the port.

According to still another illustrative embodiment of the present disclosure, a faucet assembly is provided. The faucet assembly includes an electronic faucet and a secondary dispensing device. The electronic faucet includes a spout, a fluid supply conduit supported by the spout, and a valve assembly including an electrically operable valve positioned to regulate fluid flow through the fluid supply conduit. The electronic faucet further includes a controller operative to control the electrically operable valve to control fluid flow through the fluid supply conduit. The controller includes a port. The controller and the port are mounted to the valve assembly. The secondary dispensing device includes a spout, a fluid supply conduit supported by the spout, and electronics operably coupled to the port of the controller of the electronic faucet. The controller of the electronic faucet is operative to at least one of control and power the electronics of the secondary dispensing device via the port to control fluid flow through the fluid supply conduit of the secondary dispensing device.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
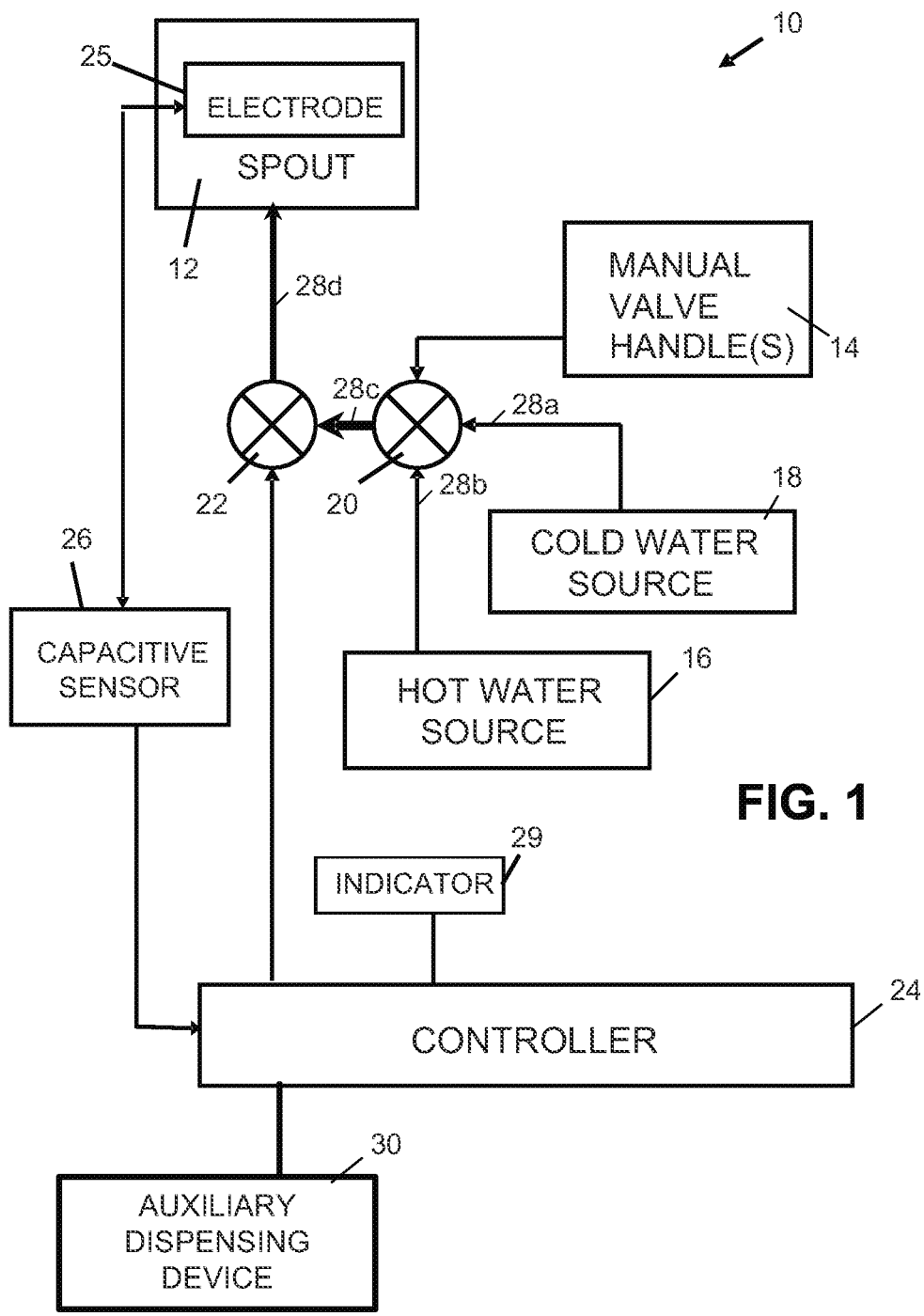
FIG. 1 is a block diagram illustrating an exemplary electronic faucet including a solenoid valve.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

Referring to FIG. 1, a block diagram of an electronic faucet 10 is illustrated according to some embodiments of the present disclosure. Electronic faucet 10 includes a spout 12 supporting a passageway or fluid conduit for delivering fluids such as water, for example. In the illustrated embodiment, the passageway of spout 12 includes fluid passages between hot and cold water sources 16, 18 and the output of spout 12. See, for example, passages 28a, 28b, 28c, 28d of FIG. 1. Electronic faucet 10 includes a solenoid valve 22 in fluid communication with hot and cold water sources 16, 18. Solenoid valve 22 is controlled electronically by a controller 24. In the illustrated embodiment, controller 24 is configured to open and close solenoid valve 22 to turn on and off the fluid flow to spout 12. In another embodiment, controller 24 is further configured to proportionally control solenoid valve 22 to adjust the flow rate of the fluid flowing through spout 12. In an illustrative embodiment described herein, solenoid valve 22 includes a pilot operated solenoid valve, although another suitable electrically operable or actuator driven valve may be provided.

In the illustrated embodiment, controller 24 controls solenoid valve 22 based on output from at least one sensor, such as a proximity sensor and/or a touch sensor, for example, to turn on and off fluid flow through spout 12. In the illustrated embodiment, a capacitive sensor 26 is in communication with controller 24 for providing signals to controller 24 indicating the detection of an object (e.g. a user's hands) on or near spout 12. Other suitable sensors may be provided for detecting an object near faucet 10. As illustrated, an electrode 25 of capacitive sensor 26 is coupled to spout 12 to detect the object contacting spout 12. Electrode 25 may be positioned in other suitable areas of faucet 10 for detecting the presence of a user's hands. In the illustrative embodiment, capacitive sensor 26 and electrode 25 are used for at least one of a touch mode and a hands-free mode of operation. In the hands free mode of operation, capacitive sensor 26 and controller 24 detect a user's hands or other object within a detection area or zone near spout 12. In one embodiment, the detection area includes the water stream and the area in the sink basin immediately surrounding the water stream. The detection area may be expanded to other areas depending on the location and sensitivity of capacitive sensor 26. In the touch mode of operation, capacitive sensor 26 and controller 24 detect a user's hands or other object upon contact with a surface of spout 12. To turn on the faucet assembly 10 in either mode, solenoid valve 22 is activated by controller 24 upon detecting the object (e.g., user's hands) to toggle water flow on and off.

In some embodiments, by sensing capacitance changes with capacitive sensor 26, controller 24 is configured to make logical decisions to control different modes of operation of faucet 10 such as changing between a manual mode of operation and a hands free mode of operation as described in U.S. Pat. No. 7,537,023; U.S. application Ser. No. 11/641,574; U.S. Pat. No. 7,150,293; U.S. application Ser. No. 11/325,128; and PCT International Application Serial Nos. PCT/US2008/01288 and PCT/US2008/013598, the disclosures of which are all expressly incorporated herein by reference.

In one embodiment, manual adjustment of the water temperature and flow rate may be provided after opening the solenoid valve 22 by manipulating a manual valve handle 14. In particular, manual valve handle 14 may be used to manipulate a valve body assembly 20 positioned in the passageway of spout 12 to adjust the temperature and/or flow of fluid from the hot and cold water sources 16, 18 to solenoid valve 22. A separate manual valve handle 14 may be provided for each of the hot and cold water sources 16, 18. Alternatively, electronic faucet 10 is a fully automatic faucet without any manual controls.

In an alternative embodiment, controller 24 may further control valve body assembly 20 electronically. In particular, valve body assembly 20 may include an electronic proportioning or mixing valve that is adjusted by controller 24 to control the mixture of hot and cold water and thus the temperature of the water flowing through spout 12. Exemplary electronically controlled mixing valves are described in U.S. Pat. No. 7,458,520 and PCT International Application Serial No. PCT/US2007/060512, the disclosures of which are expressly incorporated by reference herein. The amount of fluid flowing from hot water source 16 and cold water source 18 may be controlled by controller 24 based on one or more user inputs, such as desired fluid temperature, desired fluid flow rate, desired fluid volume, various task based inputs, various recognized presentments, and/or combinations thereof. For example, faucet 10 may include a temperature sensor (e.g., temperature sensor 54 described herein) in fluid communication with the output of the proportioning valve to provide feedback to controller 24 for use in controlling the water temperature. In one embodiment, controller 24 controls the proportional valve via the auxiliary port 56 (FIG. 2) described herein.

In one embodiment, faucet 10 includes one or more indicators 29 controlled by controller 24 to provide a visual or audio indication of the operational mode (e.g., hands free and/or touch mode) and/or water temperature of the electronic faucet 10. An exemplary indicator 29 includes a light-emitting diode (LED) or other light source or audible device positioned near faucet 10. Other exemplary indicators 29 include a liquid crystal display (LCD) and a magnetically latching mechanical indicator. In one embodiment, indicators 29 are operative to indicate operating mode and/or the temperature of the water flowing through faucet 10 based on the selective illumination of different colored LED's or a single multi-colored LED.

In the illustrated embodiment, controller 24 is operative to control another remote dispensing device in addition to electronic faucet 10, illustratively auxiliary dispensing device 30. An exemplary auxiliary dispensing device 30 includes a soap dispenser, another faucet spout, a beverage dispenser, or another suitable dispensing device. Auxiliary dispensing device 30 may be positioned adjacent the same sink basin as spout 12. Alternatively, dispensing device 30 may be positioned to dispense into a different sink basin, such as another sink basin in a bathroom or kitchen or in another room, for example. As described in detail herein, controller 24 includes an auxiliary port 56 (see FIGS. 2 and 3) for remotely controlling and powering the auxiliary dispensing device 30 via a cable 57 (FIG. 2).

Figure 2:
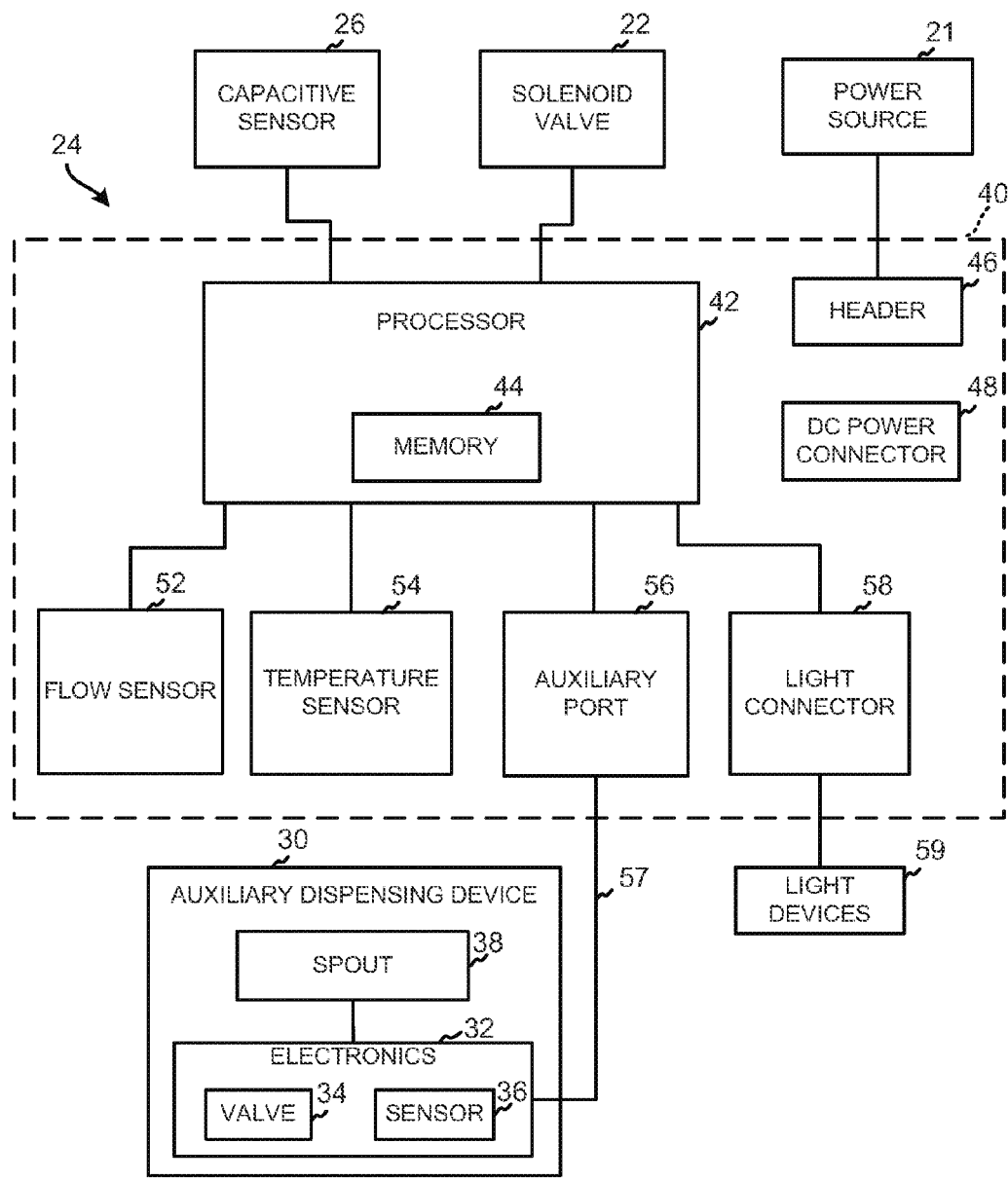
FIG. 2 is a block diagram illustrating an exemplary controller of the electronic faucet of FIG. 1.

Referring to FIG. 2, a block diagram of an exemplary controller 24 of FIG. 1 is illustrated. Controller 24 includes a printed circuit board 40 and multiple circuit components mounted to the printed circuit board 40. Illustratively, a processor 42, a flow sensor 52, a temperature sensor 54, an auxiliary port 56, and a light connector 58 are coupled to circuit board 40. A connection header 46 is coupled to circuit board 40 for coupling a power line from an external power source 21. In one embodiment, power source 21 is a battery power supply or other direct current (DC) power supply. Internal or external memory 44 of processor 42 includes software and/or firmware containing instructions executed by processor 42 for controlling solenoid valve 22, other components of faucet 10, and other dispensing devices (e.g., secondary dispensing device 30). Processor 42 controls solenoid valve 22 based on output from capacitive sensor 26, flow sensor 52, and/or temperature sensor 54.

Light connector 58 is configured to route electrical current to light devices 59, such as LED's for example, to illuminate light devices 59. In one embodiment, light devices 59 are different colors, and processor 42 selectively controls light devices 59 to illuminate different colors based on the operating mode of the faucet 10 and/or the temperature of the water flowing through faucet 10. An exemplary light connector 58 includes an audio jack connector. In one embodiment, indicators 29 of FIG. 1 include the light devices 59 of FIG. 2. In the exemplary embodiment, controller 24 also includes a power connector 48 for coupling controller 24 to a wall outlet or other building power supply to power controller 24. Power connector 48 includes a rectifier to convert alternating current (AC) power to DC power levels suitable for controller 24.

Figure 3:
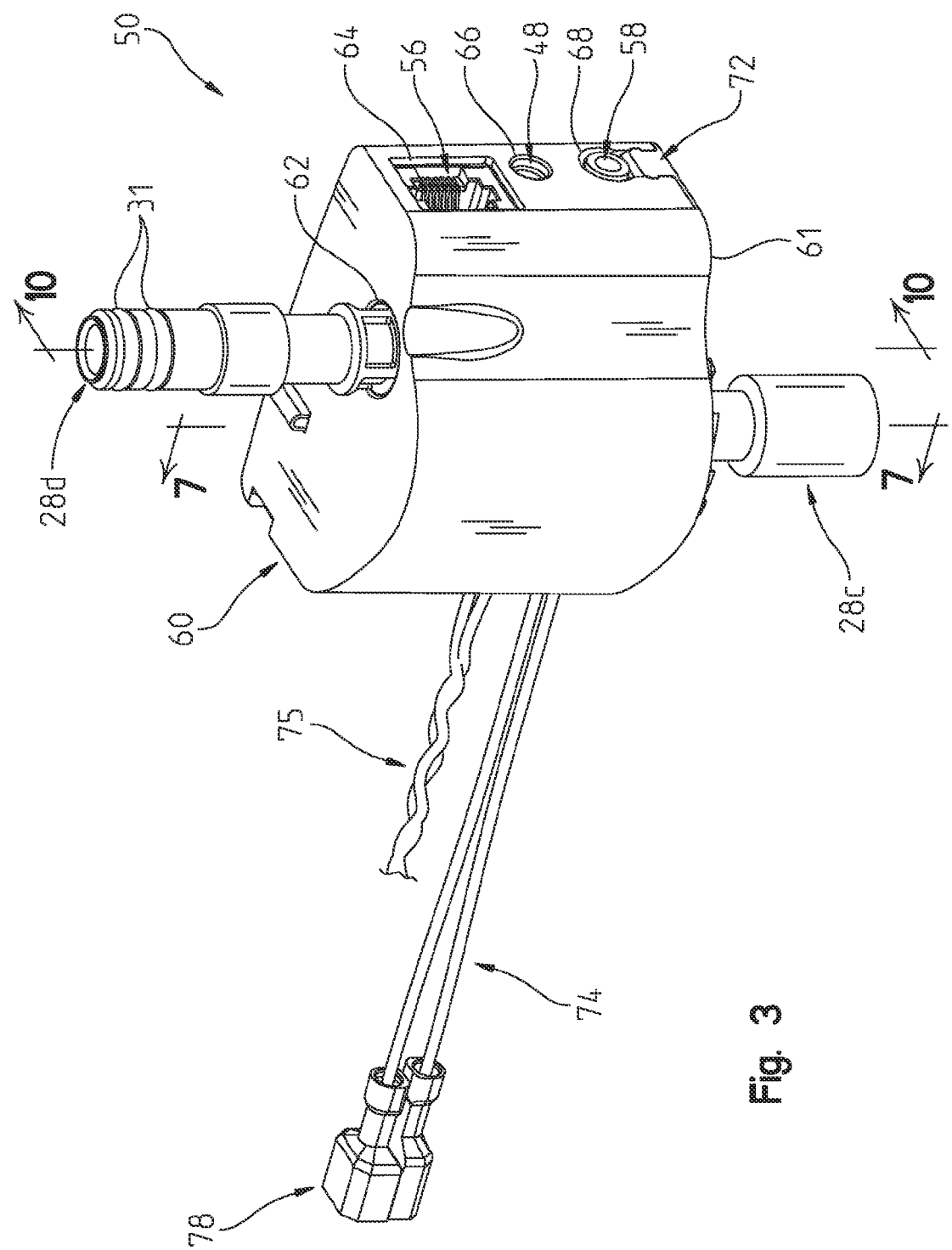
FIG. 3 is a perspective view of an exemplary solenoid valve assembly of the electronic faucet of FIG. 1 including an outer housing.
Figure 4:
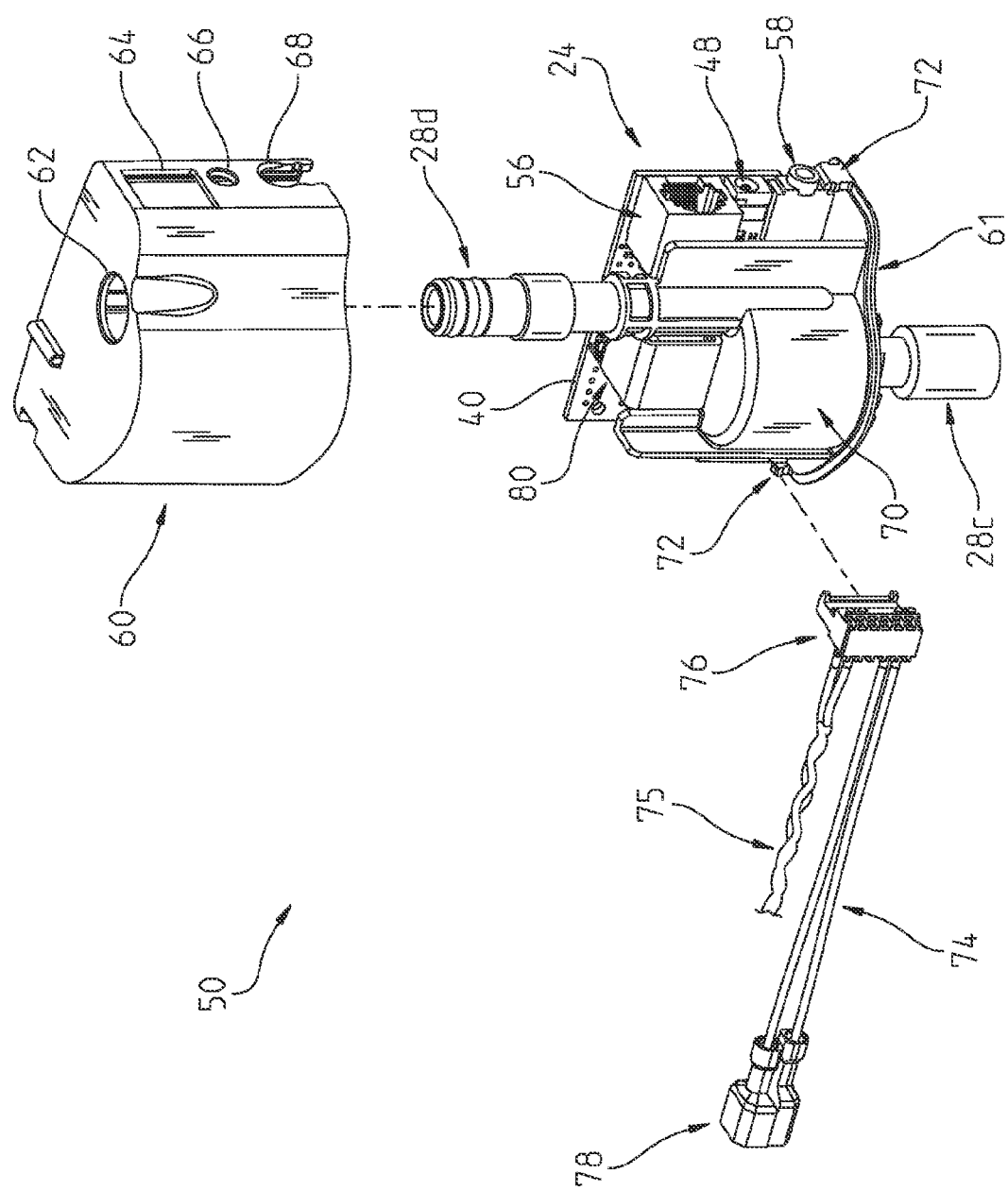
FIG. 4 is a perspective view of the solenoid valve assembly of FIG. 3 with the outer housing removed.

Referring to FIGS. 3 and 4, an exemplary solenoid valve assembly 50 is illustrated. Fluid enters a valve housing 70 (FIG. 4) of solenoid valve assembly 50 via fluid conduit 28c and exits valve housing 70 via fluid conduit 28d to spout 12 (FIG. 1). Fluid conduit 28c includes seals 31 (FIG. 3) providing a sealing connection to a mating component of the fluid conduit of spout 12. Solenoid valve assembly 50 includes an outer housing 60 for enclosing and protecting controller 24 and solenoid valve 22 positioned within housing 60. Outer housing 60 is configured to slide over the top of valve housing 70 (FIG. 4) and mount to a base 61 of assembly 50. Clips 72 on opposite ends of base 61 are configured to engage outer housing 60, although other suitable fasteners may be used to couple outer housing 60 to base 61. Outer housing 60 includes an opening 62 for receiving fluid conduit 28d. Outer housing 60 further includes an opening 64 that provides access to auxiliary port 56, an opening 66 that provides access to DC power connector 48, and an opening 68 that provides access to light connector 58. As illustrated in FIG. 4, controller 24 is mounted to valve housing 70 of assembly 50. A power cable 74 routes power from power source 21 to controller 24 for powering the electronic components of controller 24. Power cable 74 includes electrical wires routed between a connector end 76 configured to couple to header 46 (FIG. 5) of controller 24 and an opposite connector end 78 configured to couple to power source 21. Additional cable wires 75 are provided to route sensor signals, such as from capacitive sensor 26, to controller 24.

Figure 5:
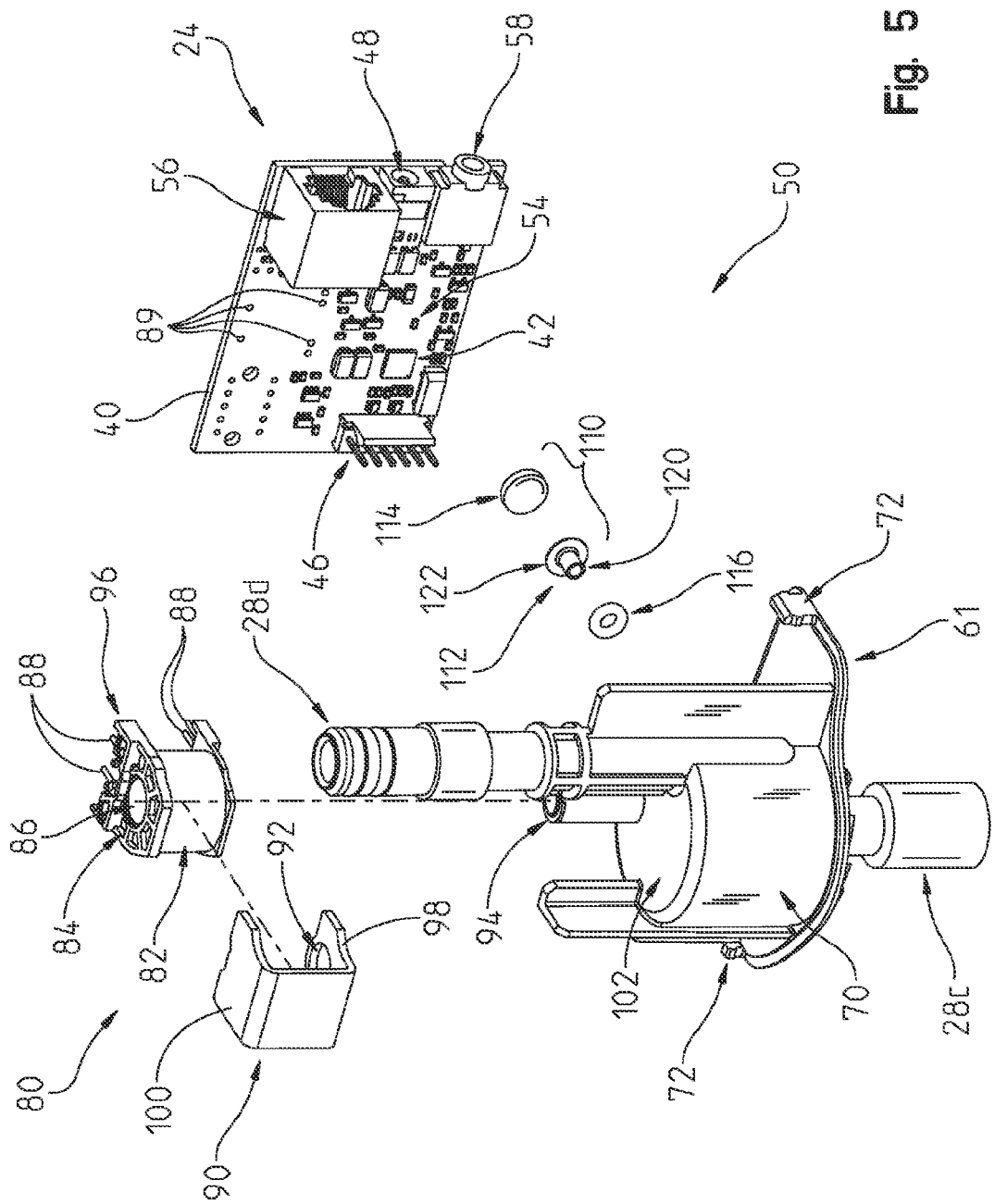
FIG. 5 is a partially exploded perspective view of the solenoid valve assembly of FIG. 3 illustrating a solenoid coil, a controller, and a temperature sensor.
Figure 6:
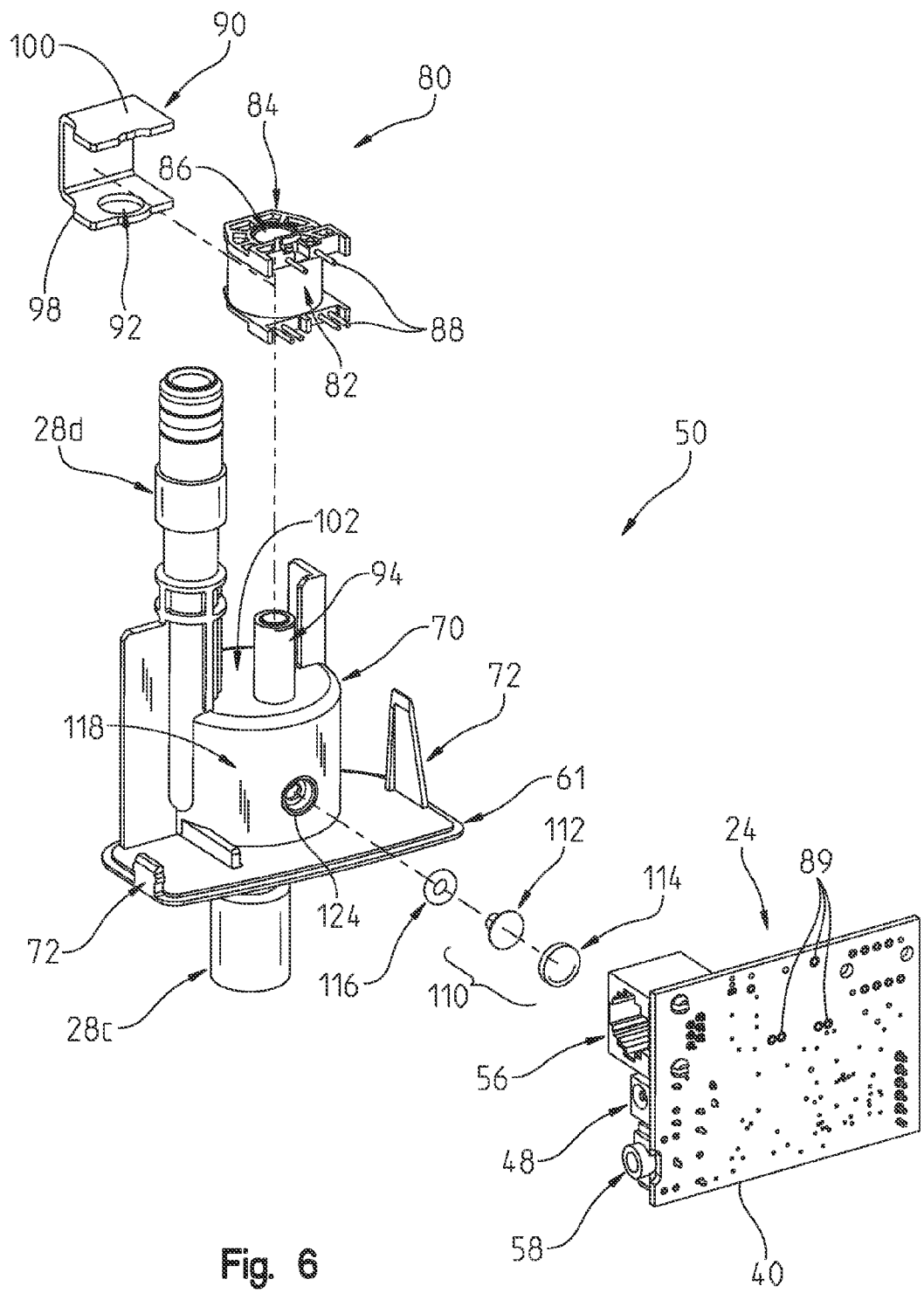
FIG. 6 is a partially exploded reverse perspective view of the solenoid valve assembly of FIG. 3 illustrating the solenoid coil, the controller, and the temperature sensor.

Referring to the partially exploded views of FIGS. 5 and 6, processor 42, header 46, temperature sensor 54, port 56, DC connector 48, and light connector 58 are illustratively mounted to printed circuit board 40. Port 56, DC connector 48, and light connector 58 are illustratively mounted at an edge of circuit board 40 to align with openings 64, 66, 68 of outer housing 60 (FIG. 3). Circuit board 40 includes other suitable electronics for controlling solenoid valve 22. Header 46 includes electrical pins configured to receive connector end 76 of power cable 74.

Auxiliary port 56 is configured to receive a connector cable 57 (FIG. 2) routed to an auxiliary or second dispensing device 30 (FIG. 2) that is controlled and powered by controller 24. Connector cable 57 includes a connector that is releasably coupled to auxiliary port 56. As such, a plug-and-play configuration is provided with auxiliary port 56 that facilitates quick coupling and decoupling of secondary devices (e.g., device 30) that are controllable with controller 24 of faucet 10. In one embodiment, more than one auxiliary dispensing device 30 is coupled to auxiliary port 56 and controlled by controller 24.

Referring again to FIG. 2, the control and power management software/firmware and control switches of controller 24 are used to control the operation of auxiliary dispensing device 30. Auxiliary dispensing device 30 may include a soap dispenser, another faucet, a beverage dispenser, a filtered water dispenser, a hot water dispenser, or another suitable dispensing device. As illustrated in FIG. 2, auxiliary dispensing device 30 includes a spout 38 that supports a fluid supply conduit. Dispensing device 30 includes electronics 32 controlled by controller 24 including an electrically operable valve 34, such as a solenoid valve 34 with a solenoid coil, positioned in the fluid supply conduit for controlling fluid flow through spout 38. Electronics 32 are releasably coupled to auxiliary port 56 via the quick-coupling connector cable 57 routed between the faucet 10 and device 30. In one embodiment, fluid flow through the auxiliary dispensing device 30 is controlled by processor 42 based on capacitive signals received from device 30 (e.g., from a sensor 36) via port 56, similar to the capacitive-based controls of faucet 10. Processor 42 is operative to sample the capacitive input signals from auxiliary dispensing device 30 (and/or from additional devices 30) to reduce the likelihood of crosstalk between the controls of electronic faucet 10 and auxiliary dispensing device(s) 30.

Controller 24 routes power received from power source 21 (FIG. 2) or DC connector 48 to electronics 32 of auxiliary dispensing device 30 via port 56 to power device 30. As such, in one embodiment, both faucet 10 and the auxiliary dispensing device 30 operate off the same power source as managed by controller 24. Controller 24 is operative to receive inputs from auxiliary dispensing device 30, process the inputs, and output electrical signals for controlling the electronics 32 (e.g., solenoid, motor, lights, etc.) of dispensing device 30 based on the received inputs. In one embodiment, auxiliary dispensing device 30 includes at least one proximity sensor 36, such as a capacitive sensor or infrared sensor, operative to detect a user's hands on or near device 30, as similarly described herein with respect to capacitive sensor 26 of electronic faucet 10. Alternatively, device 30 may include a switch device configured to instruct controller 24 to activate the device 30 upon actuation of the switch device by the user. Controller 24 controls fluid flow (e.g., water, soap, beverage, etc.) through dispensing device 30 based on the received signals from the proximity sensor 36 or the switch device. Controller 24 is also operative to power display lights, such as LED's, on auxiliary dispensing device 30 corresponding to the various operational modes or states of device 30.

Accordingly, auxiliary dispensing device 30 may include a passive or dumb electrical interface with limited or no active controls wherein the electronics 32 of the interface are controlled remotely by controller 24 of faucet 10 via auxiliary port 56. In one embodiment, the circuitry of auxiliary dispensing device 30 includes the necessary circuitry for connecting the device 30 to controller 24, for detecting and sending an activation request to controller 24, and for actuating the fluid valve based on controls from controller 24.

In one example, auxiliary port 56 includes a multi-pin (e.g., 6 pin) registered jack (RJ) receptacle, although any suitable electrical connector may be used for port 56. In one embodiment, the multiple pin connections of auxiliary port 56 include a switched power supply connected to battery voltage (e.g., power source 21) for powering electronics of auxiliary dispensing device 30, a sensor line used as either an input or output (I/O line) connected to processor 42, a ground line, a proximity (e.g., capacitive) sense input connected to processor 42, and two power lines for display lights (e.g., LED's) of device 30. In one embodiment, the LED power lines and the power supply line are switched on and off at processor 42.

Referring to FIG. 5, temperature sensor 54 is mounted (e.g., soldered) directly to circuit board 40. As such, sensor 54 is positioned outside of valve housing 70 (see also FIG. 7). In one embodiment, temperature sensor 54 includes a surface-mount type N thermistor soldered to circuit board 40, although other suitable temperature sensors may be used. A heat transfer device 110 extends from temperature sensor 54 to inside an interior region or waterway 130 (FIG. 7) of valve housing 70. Heat transfer device 110 is operative to transfer heat from the fluid within interior region 130 of valve housing 70 to temperature sensor 54, as described herein.

Heat transfer device 110 includes a rivet 112 and a pad 114 positioned between rivet 112 and sensor 54. In one embodiment, rivet 112 is made of copper or another suitable metal, and pad 114 is made of thermally conductive, electrically insulating foam, although other suitable thermally conductive materials may be used. In assembly, rivet 112, pad 114, and sensor 54 are in contact with each other (see FIG. 7) to facilitate heat transfer. In one embodiment, foam pad 114 provides a soft component between rivet 112 and sensor 54 to reduce the likelihood that temperature sensor 54 is damaged due to contact with heat transfer device 110. Further, pad 114 is electrically insulating such that the electrical contacts of temperature sensor 54 are not shorted. In one embodiment, foam pad 114 is coupled to rivet 112 and to circuit board 40 over temperature sensor 54 with an adhesive or other suitable coupler.

Figure 7:
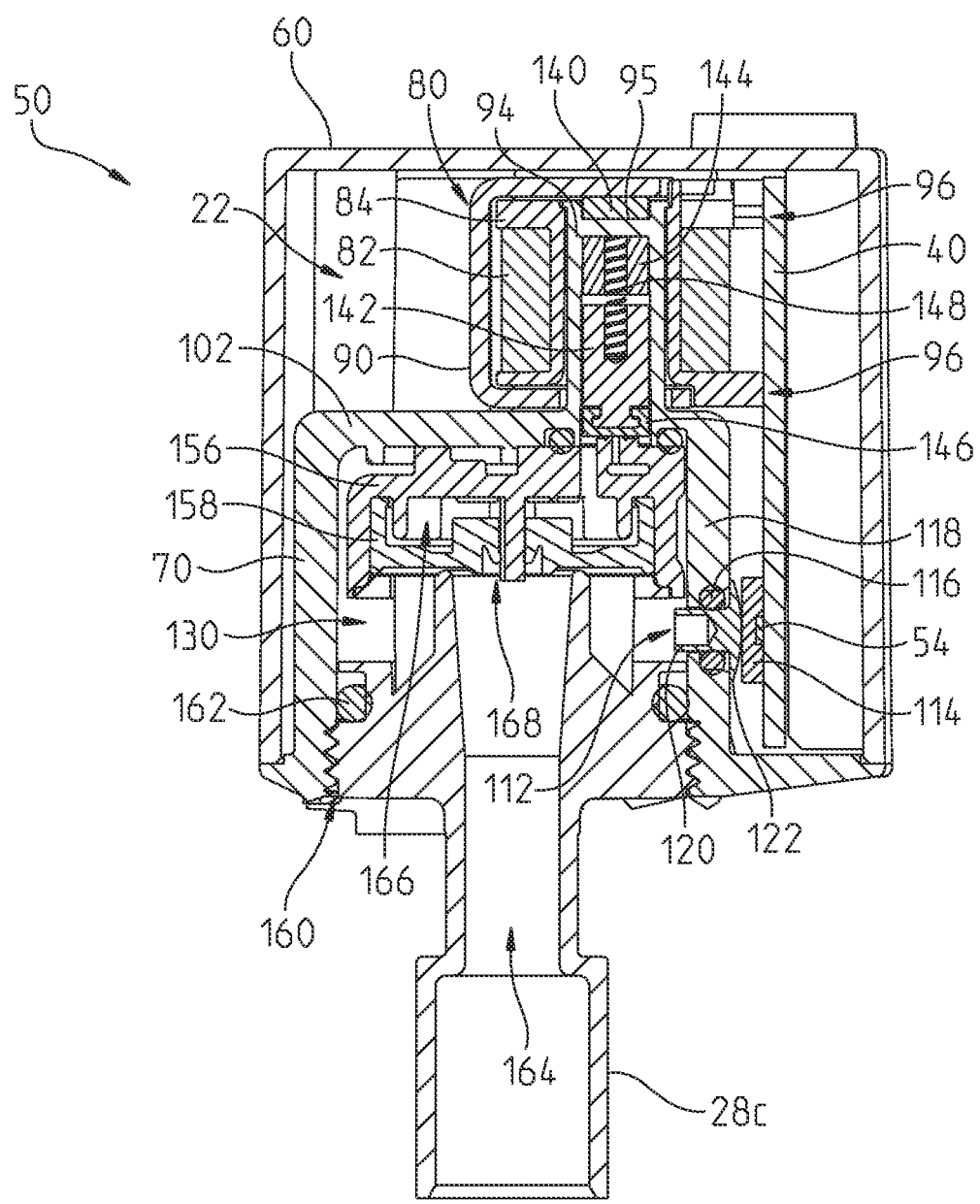
FIG. 7 is a cross-sectional view of the solenoid valve assembly of FIG. 3 taken along line 7-7 of FIG. 3.

Referring to FIGS. 5-7, rivet 112 includes a hollow shaft portion 120 and a larger diameter head portion 122. As illustrated in FIG. 7, shaft portion 120 extends into the interior region 130 of valve housing 70. Shaft portion 120 is illustratively cylindrical and is configured to receive water from interior region 130 within the hollow interior. In one embodiment, the semi-tubular construction of shaft portion 120 serves to increase the area of rivet 112 exposed to the water. Head portion 122 illustratively has an outer diameter that approximates the outer diameter of pad 114. As illustrated in FIGS. 5-7, an o-ring seal 116 is received by shaft portion 120 of rivet 112. Seal 116 is seated in an opening 124 (FIG. 6) molded in an outer wall 118 of valve housing 70. As such, seal 116 provides a sealed interface between heat transfer device 110 and wall 118 to reduce the likelihood of water from valve housing 70 leaking past heat transfer device 110. Head portion 122 abuts wall 118 of valve housing 70 to hold seal 116 within opening 124, as illustrated in FIG. 7. Rivet 112 transfers heat from fluid adjacent hollow shaft portion 120 to head portion 122 and to pad 114, and pad 114 transfers the heat to temperature sensor 54 on circuit board 40. Temperature sensor 54 outputs a signal representative of the detected heat to processor 42 for processing. In one embodiment, rivet 112 is coupled to wall 118 of valve housing 70 with an adhesive or another suitable fastener.

Processor 42 is operative to control faucet 10 based on the water temperature measured with temperature sensor 54. In one embodiment, processor 42 is operative to selectively control light devices 59 (FIG. 2) to illuminate different colored devices 59 to indicate the water temperature to the user. For example, blue indicates cold water, red indicates hot water, and shades between red and blue indicate temperatures between hot and cold. Alternatively, processor 42 displays the water temperature numerically on a digital or analog display (e.g., an LCD display of indicator 29). In one embodiment, controller 24 is programmed to shut off water flow, i.e., close solenoid valve 22, automatically upon the detected water temperature exceeding a threshold temperature. An exemplary threshold temperature is about 120 degrees Fahrenheit, although other suitable thresholds may be set. In one embodiment, controller 42 uses the temperature information from sensor 54 to control an electrically operable mixing valve (e.g., valve 20) in series with solenoid valve 22. The mixing valve is controlled to mix water proportionally from hot and cold sources 16, 18 to achieve a desired temperature. The desired temperature may be selectable by the user or may be predetermined and programmed in memory of processor 42. As such, closed loop temperature control of the water through faucet 10 may be provided with temperature sensor 54. Other suitable controls may be implemented based on water temperature.

As illustrated in FIGS. 5 and 6, a solenoid coil 80 of solenoid valve 22 includes coil wire 82 wound around a bobbin 84. Bobbin 84 includes a cylindrical inner opening 86 sized to receive a cylindrical portion 94 of valve housing 70. In the illustrated embodiment, solenoid coil 80 is mounted directly to circuit board 40 (see FIGS. 4 and 7-9). In particular, bobbin 84 includes a plurality of metal pins 88 that are received through corresponding openings 89 of circuit board 40. In one embodiment, conductive pins 88 are soldered to circuit board 40. Ends of coil wire 82 are terminated at pins 88 (e.g., wound around pins 88) such that controller 24 is operative to selectively energize and de-energize coil 80 via pins 88.

In one embodiment, bobbin 84 is made of plastic or another suitable nonconductive material. As illustrated in FIG. 7, ends 96 of bobbin 84 are configured to abut circuit board 40. Circuit board 40 is illustratively parallel to the opening 86 extending through solenoid coil 80. In one embodiment, with solenoid coil 80 mounted directly to circuit board 40, a compact valve assembly 50 with minimal wiring is provided with the controller 24 located inside outer housing 60.

Referring still to FIGS. 5 and 6, bobbin 84 slides over cylindrical portion 94 of valve housing 70 to couple solenoid coil 80 to valve housing 70. In the illustrated embodiment, a circumferential lip or flange 97 (FIG. 8) of cylindrical portion 94 engages a corresponding groove formed in the top surface of bobbin 84 to secure bobbin 84 to cylindrical portion 94. Valve housing 70, including cylindrical portion 94, is made of plastic or another suitable electrically and magnetically insulating material. A U-shaped metal bracket 90 is sized to fit over solenoid coil 80. Metal bracket 90 includes a bottom flange 98 having an opening 92 sized to receive cylindrical portion 94. As such, flange 98 is positioned between solenoid coil 80 and a top wall 102 of valve housing 70. A top flange 100 of bracket 90 slides over the top of solenoid coil 80. As such, metal bracket 90 extends along three sides of solenoid coil 80. As described herein, metal bracket 90 serves as a component for routing magnetic flux generated with solenoid coil 80. In particular, when solenoid coil 80 is energized by controller 24, bracket 90 provides a flow path for the generated magnetic flux.

Figure 8:
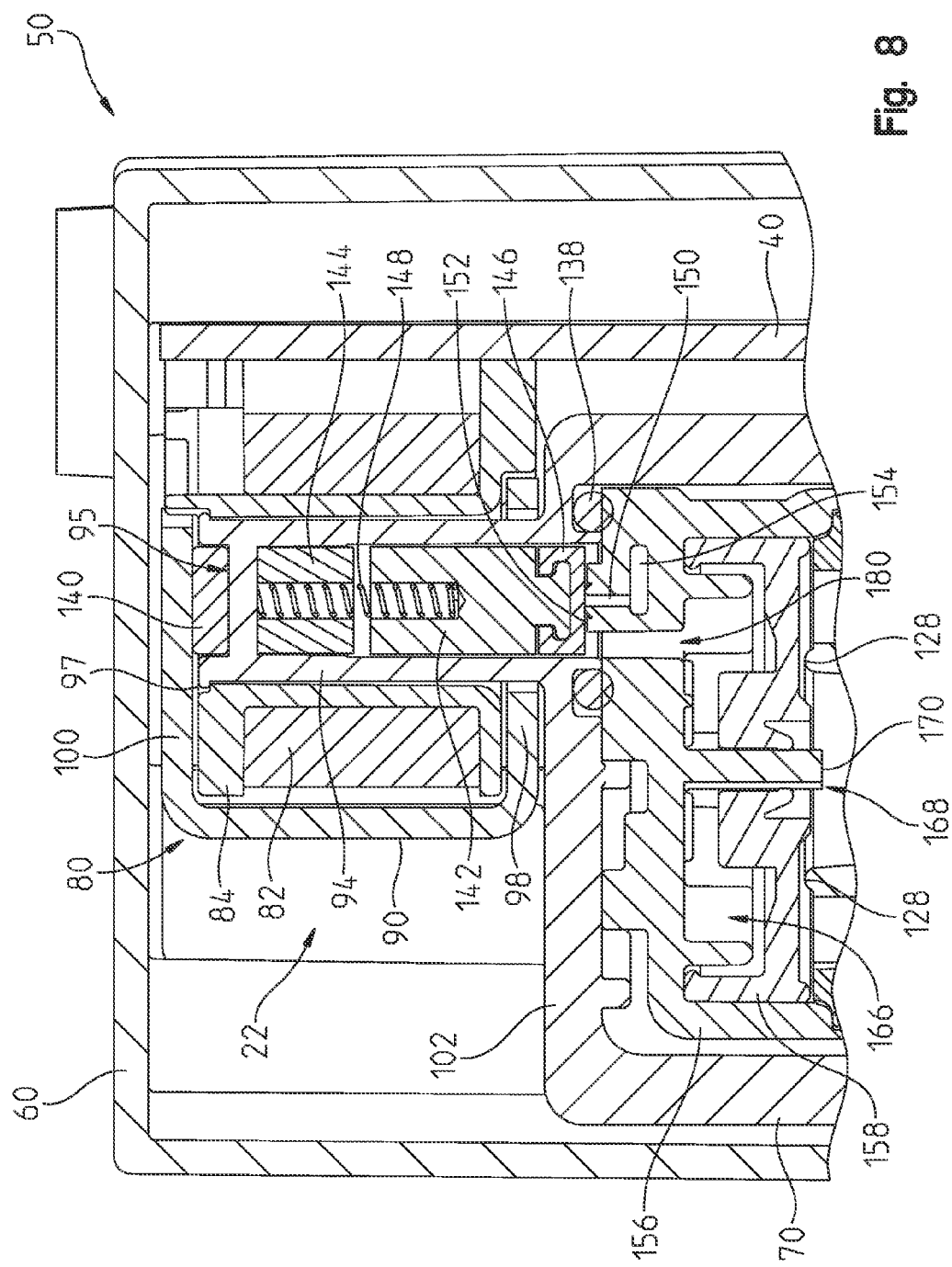
FIG. 8 is a close-up of the cross-sectional view of FIG. 7 with an armature of the solenoid coil in a closed position.
Figure 9:
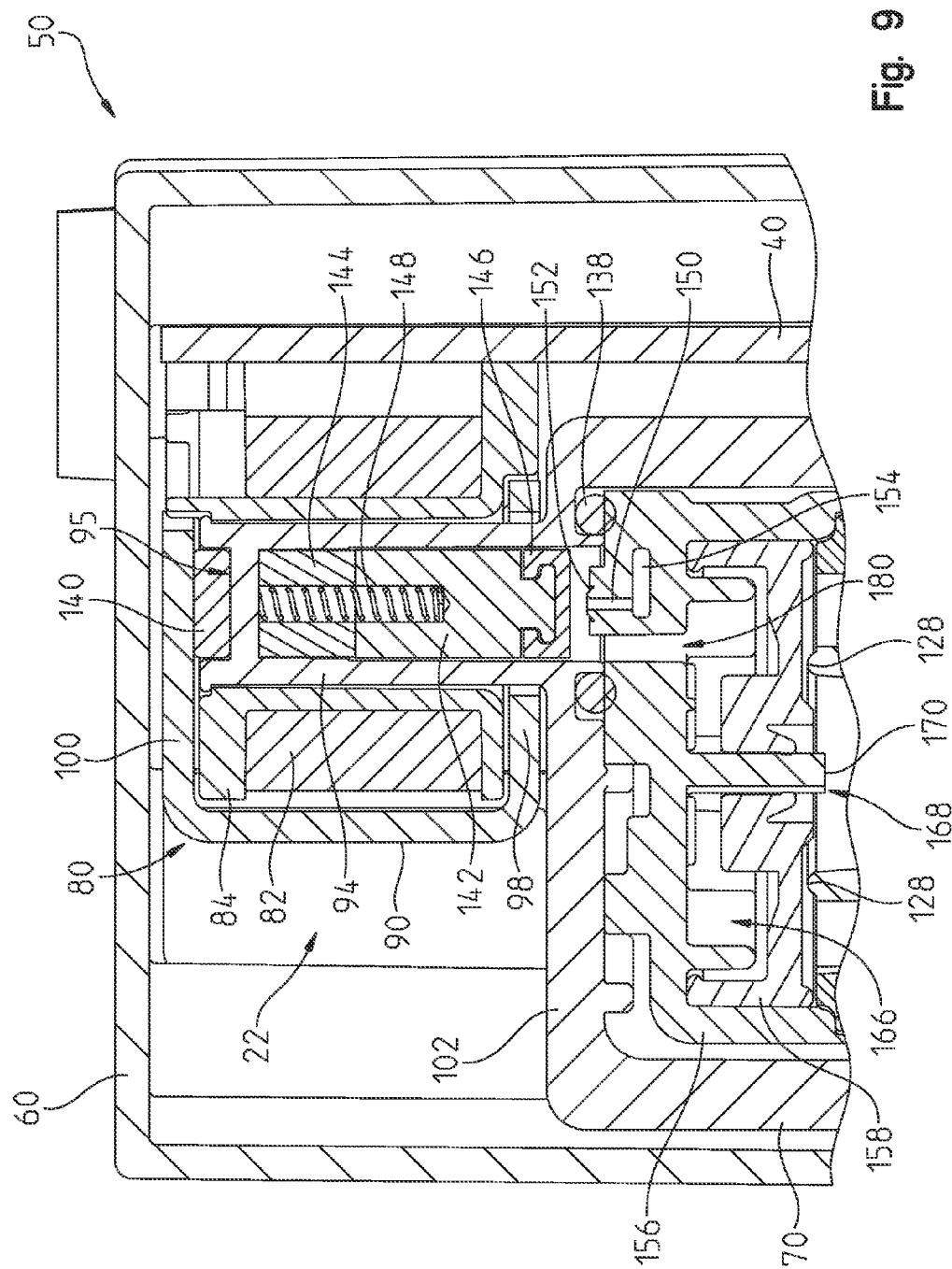
FIG. 9 is a close-up of the cross-sectional view of FIG. 7 with the armature of the solenoid coil in an open position.
Figure 10:
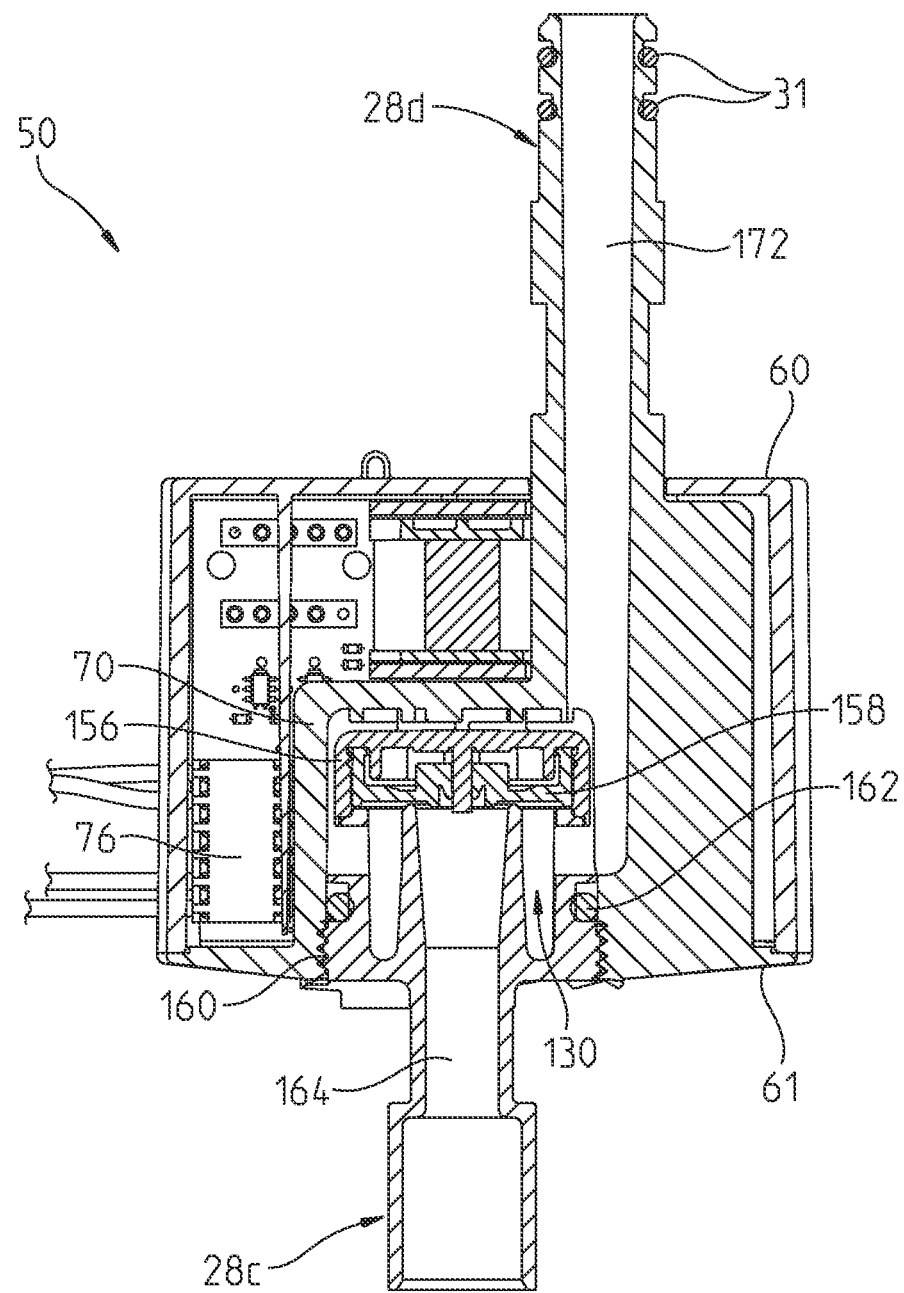
FIG. 10 is a cross-sectional view of the solenoid valve assembly of FIG. 3 taken along line 10-10 of FIG. 3 illustrating a flow path through the solenoid valve assembly.

Referring to FIGS. 7-9, solenoid valve 22 further includes a permanent magnet 140, a moveable valve member or armature 142, a fixed member or pole piece 144, an armature seal 146, a diaphragm housing 156, and a flexible diaphragm 158. Armature 142 and pole piece 144 are wetted and sealed within the hollow interior of cylindrical portion 94. Armature seal 146 is coupled to an end of armature 142 and is configured to seal a pilot hole 150 (FIGS. 8 and 9) formed in diaphragm housing 156. In one embodiment, armature seal 146 is made of rubber, and armature 142 and pole piece 144 are made of metal or another suitable magnetically conductive material.

Armature 142 is operably coupled to solenoid coil 80. In particular, the magnetic field generated with coil 80 is configured to move armature 142 between a closed position and an open position. Armature 142, also referred to as a plunger or moveable core, is configured to slide within cylindrical portion 94 between the closed position in contact with a pilot hole seat 152 (FIGS. 8 and 9) and the open position in contact with pole piece 144. When armature 142 is in the closed position, armature seal 146 engages pilot hole seat 152 to close pilot hole 150, and a gap is formed between armature 142 and pole piece 144. When armature 142 is in the open position, the gap between armature 142 and pole piece 144 is closed and water flows through the open pilot hole 150 and through an outlet 154 (FIGS. 8 and 9) formed in valve housing 70. A spring 148 within cylindrical portion 94 biases armature 142 away from pole piece 144 and towards pilot hole seat 152. In the illustrated embodiment, armature 142 moves within cylindrical portion 94 along an axis that is parallel to circuit board 40. An o-ring seal 138 (FIG. 8) is positioned between diaphragm housing 156 and wall 102 of valve housing 70 to form a sealing surface surrounding the interface between armature seal 146 and pilot hole 150.

Permanent magnet 140 is positioned in a seat 95 formed in the top of cylindrical portion 94. Magnet 140 serves as a latching magnet to hold armature 142 against pole piece 144 in the open position. In particular, permanent magnet 140 is sized and spaced relative to armature 142 and pole piece 144 such that when armature 142 is in the closed position, the magnetic field induced in pole piece 144 by magnet 140 is not strong enough to overcome the opposing biasing force provided by spring 148 due to the gap between armature 142 and pole piece 144. After coil 80 is energized to move armature 142 to the open position against pole piece 144, the magnetic field induced by magnet 140 in pole piece 144 is operative to overcome the opposing biasing force of spring 148 to latch or hold armature 142 in the open position after coil 80 is de-energized.

As illustrated in FIG. 7, fluid conduit 28c is coupled to valve housing 70 via a threaded interface 160 and forms a part of valve housing 70 to define interior region 130. An o-ring seal 162 is positioned between valve housing 70 and fluid conduit 28c to facilitate sealing the water within valve housing 70 at interface 160. Fluid conduit 28c provides a passageway 164 in fluid communication with interior region 130 of valve housing 70. Flexible diaphragm 158 is positioned within diaphragm housing 156. In one embodiment, diaphragm 158 is made of flexible rubber. An upper diaphragm chamber 166 is formed between diaphragm housing 156 and the back side of diaphragm 158. When diaphragm chamber 166 is flooded, water pressure in diaphragm chamber 166 forces diaphragm 158 into a closed position such that diaphragm 158 abuts and seals a circumferential lip or bead 128 (FIG. 8) of conduit 28c. As such, water from passageway 164 is prevented from entering interior region 130 of valve housing 70 past circumferential lip 128 when diaphragm 158 is in the closed position. In addition, diaphragm 158, when closed, provides a circumferential seal around a center post 170 (FIG. 8) of diaphragm housing 156 to close an inlet 168 formed in a notch of post 170.

Solenoid valve 22 is illustratively a pilot operated solenoid valve. Before an initial use of solenoid valve assembly 50, diaphragm chamber 166 is empty of water. When water is initially routed towards the front side of diaphragm 158 via conduit 28c, the center portion of diaphragm 158 (near post 170) collapses or flexes upwardly (as viewed from the perspective of FIGS. 7-10) and the water enters diaphragm chamber 166 through the opened inlet 168 formed in post 170. With coil 80 de-energized and armature 142 in the closed position, the water floods diaphragm chamber 166. Some water also flows between lip 128 and diaphragm 158 into the surrounding interior region 130 of valve housing 70. Diaphragm chamber 166 illustratively occupies a larger area on the back side of diaphragm 158 as compared to the area occupied by passageway 164 on the front side of diaphragm 158 within lip 128. When the water pressure at the back side (the chamber 166 side) of diaphragm 158 becomes greater than the water pressure at the front side (the passageway 164 side) of diaphragm 158 due to the greater area diaphragm chamber 166, diaphragm 158 is forced back into the closed position to seal off inlet 168 and to seal off circumferential lip 128. As such, diaphragm 158 is in the closed position and diaphragm chamber 166 is filled with water prior to energizing solenoid coil 80.

In operation, controller 24 energizes solenoid coil 80 upon detecting a user's hands via capacitive sensor 26 (FIG. 1) to turn on faucet 10. Energizing solenoid coil 80 with electrical current is operative to initiate the pilot control of solenoid valve 22 to thereby open solenoid valve 22. In particular, when coil 80 is energized, the generated magnetic flux magnetizes armature 142 and pole piece 144 to cause armature 142 and pole piece 144 to be attracted to each other. The magnetic field moves armature 142 into contact with pole piece 144 in the open position to close the gap between armature 142 and pole piece 144 and to open pilot hole 150. In the illustrated embodiment, controller 24 de-energizes coil 80 after a predetermined duration, and the magnetic field induced by permanent magnet 140 in pole piece 144 holds armature 142 in the open position against pole piece 144, as described herein. Alternatively, solenoid coil 80 may remain energized while faucet 10 is on to hold armature 142 in the open position.

With armature 142 in the open position (see FIG. 9), water in upper diaphragm chamber 166 moves through a channel 180 in valve housing 70 and exits through the opened pilot hole 150. The water through pilot hole 150 exits through an outlet 154 which opens into the interior chamber 130 (FIG. 7) of valve housing 70. With the water pressure reduced on the back side of diaphragm 158 in chamber 166, diaphragm 158 collapses and opens solenoid valve 22 such that water from passageway 164 flows between diaphragm 158 and lip 128 into the surrounding interior region 130 of valve housing 70. Water in the interior region 130 moves through a passageway 172 (FIG. 10) formed in fluid conduit 28d and exits spout 12 (FIG. 1) of faucet 10.

When controller 24 no longer detects the user's hands via capacitive sensor 26 (and/or after a suitable delay), controller 24 energizes solenoid coil 80 with a reverse current to disrupt the magnetic field of magnet 140 that holds armature 142 in the open position. In particular, energized coil 80 induces a magnetic field in armature 142 and pole piece 144 having an opposite polarity as the magnetic field induced by permanent magnet 140, thereby cancelling the attraction between pole piece 144 and armature 142. As such, the opposite polarity magnetic field and the biasing force of spring 148 force armature 142 back to the closed position against seat 152 to close pilot hole 150. With pilot hole 150 closed, diaphragm chamber 166 is re-flooded to force diaphragm 158 to the closed position against lip 128. As a result, solenoid valve 22 is closed and water flow through spout 12 is stopped.

In one embodiment, the force required to collapse diaphragm 158 to open solenoid valve 22 is small due to the small size of pilot hole 150 relative to the valve opening between diaphragm 158 and lips 128. In one embodiment, inlet 168 formed in the notch of post 170 of diaphragm housing 156 serves to bleed water slowly into diaphragm chamber 166 when closing solenoid valve 22, thereby providing a soft shutoff for faucet 10. In one embodiment, inlet 168 also serves as a filter to block particles in passageway 164 from entering diaphragm chamber 166, thereby improving the cleanliness of the area within diaphragm chamber 166.

In one embodiment, controller 24 is operative to control solenoid valve 22 further based on output from flow sensor 52 of FIG. 2. For example, in one embodiment controller 24 controls solenoid valve 22 to dispense a predetermined volume of water before automatically shutting off faucet 10. In another example, controller 24 may control the flow of water through spout 12 to a desired flow rate either specified by the user or set by the manufacturer. In another example, controller 24 detects a malfunction of faucet 10 based on an improper flow rate through spout 12. Other suitable controls may be implemented based on flow sensor 52. Flow sensor 52 may include an impeller positioned in the flow path (e.g., in fluid conduit 28d) and a Hall effect sensor coupled to circuit board 40 that detects the position of the impeller to track flow capacity through fluid conduit 28d. Other suitable flow sensors 52 may be provided.

In one embodiment, auxiliary port 56 is configured to connect an input device to controller 24. The input device may route control and/or feedback signals to controller 24 used to control faucet 10. An exemplary input device includes a foot switch or a microphone. In one embodiment, controller 24 receives inputs from a foot switch via auxiliary port 56 and controls faucet 10 based on the foot switch inputs. For example, a foot switch may be positioned below the sink basin. Upon actuation by a user, the foot switch sends a signal to controller 24 via auxiliary port 56 instructing controller 24 to turn on or off faucet 10 or to adjust the flow rate or temperature of the fluid. In another embodiment, controller 24 powers and controls a plurality of light devices (e.g., LED's) positioned around the sink basin via auxiliary port 56. In another embodiment, a microphone is operably connected to auxiliary port 56 of controller 24 to provide voice activation of faucet 10. For example, controller 24 detects audible signals (e.g., a user's voice) through the microphone and controls faucet 10 based on the audible signals. Exemplary voice activated controls include on/off, flow rate, and water temperature.

U.S. patent application Ser. No. 12/525,324, filed Nov. 11, 2009; U.S. patent application Ser. No. 12/600,769, filed Nov. 18, 2009; U.S. patent application Ser. No. 12/763,690, filed Apr. 20, 2010; and U.S. patent application Ser. No. 13/224,982, filed Sep. 2, 2011, are expressly incorporated by reference herein.

Although the invention has been described in detail with reference to certain preferred embodiments, variations and modifications exist within the spirit and scope of the invention as described and defined in the following claims.

The invention claimed is:

1. An electronic faucet comprising:
   a spout;
   a fluid supply conduit supported by the spout;
   a valve assembly including a solenoid valve positioned to control fluid flow through the fluid supply conduit, the solenoid valve including a solenoid coil and a moveable valve member operably coupled to the solenoid coil; and
   a controller operative to control the solenoid valve, the controller including a circuit board directly mounted to the valve assembly and a processor mounted to the circuit board to control the solenoid valve, the solenoid coil including at least one conductive element, the solenoid coil being directly mounted to the circuit board by way of the at least one conductive element being received by at least one opening in the circuit board.

2. The faucet of claim 1, further including a sensor coupled to the faucet and operative to provide a signal to the controller, the processor of the controller being operative to at least one of open and close the solenoid valve based on the signal provided by the sensor.

3. The faucet of claim 2, wherein the sensor is operative to at least one of detect an object in a detection zone near the spout and detect the object contacting the spout, and the sensor transmits the signal representative of the detection of the object to the controller.

4. The faucet of claim 1, wherein the valve assembly further includes an outer housing, and the circuit board and the solenoid valve are positioned in the outer housing.

5. The faucet of claim 1, wherein the solenoid coil includes a bobbin and coil wire wound around the bobbin, and the bobbin is mounted to the circuit board.

6. The faucet of claim 5, wherein the bobbin includes conductive pins coupled to the circuit board, and the coil wire is connected to the conductive pins.

7. The faucet of claim 1, wherein an opening extends through the solenoid coil, and the circuit board is positioned parallel to the opening through the solenoid coil.

8. The faucet of claim 7, wherein the valve assembly further includes a valve housing having an extended portion and the moveable valve member is disposed within the extended portion, and the opening of the solenoid coil receives the extended portion of the valve housing.

9. An electronic faucet comprising:
a spout;
a fluid supply conduit supported by the spout;
a valve assembly including an electrically operable valve positioned to regulate fluid flow through the fluid supply conduit;
a controller including a circuit board coupled to the valve assembly and a processor operative to control the electrically operable valve to control fluid flow through the fluid supply conduit, the controller including a port in communication with the processor, the port being releasably coupled to electronics of a secondary dispensing device, the controller being operative to at least one of control and power the electronics of the secondary dispensing device via the port; and
wherein the electrically operable valve includes a solenoid valve having a solenoid coil mounted to the circuit board.

10. The faucet of claim 9, wherein the processor is operative to control an electrically operable valve of the secondary dispensing device via the port to control fluid flow through the secondary dispensing device.

11. The faucet of claim 10, wherein the processor is operative to receive input signals from a proximity sensor of the secondary dispensing device via the port and to output electrical control signals to the secondary dispensing device via the port to control the electrically operable valve of the secondary dispensing device based on the input signals.

12. The faucet of claim 9, further including an electrical cable routed from the port to the electronics of the secondary dispensing device to route control signals from the controller of the electronic faucet to the electronics of the secondary dispensing device, the electrical cable including a connector that is releasably coupled to the port.

13. The faucet of claim 9, wherein the controller is operably coupled to a power source for powering the electronic faucet, and the controller powers the electronics of the secondary dispensing device from the power source via the port.

14. The faucet of claim 9, wherein the secondary dispensing device includes at least one of a soap dispenser and a beverage dispenser.

15. The faucet of claim 9, wherein the secondary dispensing device includes an electronic faucet.

16. The faucet of claim 9, wherein the processor and the port are mounted to the printed circuit board.

17. The faucet of claim 16, wherein the valve assembly includes an outer housing having an opening, the printed circuit board and the electrically operable valve are positioned in the outer housing, and the port is accessible through the opening of the outer housing.

18. A faucet system including:
an electronic faucet including a spout, a fluid supply conduit supported by the spout, a valve assembly having an electrically operable valve positioned to regulate fluid flow through the fluid supply conduit, and
a controller operative to control the electrically operable valve to control fluid flow through the fluid supply conduit, the controller including a circuit board and a port, the controller and the port being mounted to the valve assembly, wherein the electrically operable valve includes a solenoid valve having a solenoid coil mounted to the circuit board; and
a secondary dispensing device including a spout, a fluid supply conduit supported by the spout, and electronics operably coupled to the port of the controller of the electronic faucet, the controller being operative to at least one of control and power the electronics of the secondary dispensing device via the port to control fluid flow through the fluid supply conduit of the secondary dispensing device.

19. The faucet system of claim 18, wherein the electronics include an electrically operable valve positioned to regulate fluid flow through the fluid supply conduit of the secondary dispensing device.

20. The faucet system of claim 19, wherein the secondary dispensing device includes a proximity sensor configured to detect an object near the spout of the secondary dispensing device and to transmit a detection signal to the controller through the port, and the controller is operative to control the electrically operable valve of the secondary dispensing device based on the detection signal.

21. The faucet system of claim 20, wherein the proximity sensor includes a capacitive touch sensor operative to detect an object contacting the spout of the secondary dispensing device.

22. The faucet system of claim 18, further including an electrical cable routed from the port of the controller to the electronics of the secondary dispensing device to route power and control signals from the controller of the electronic faucet to the electronics of the secondary dispensing device, the electrical cable including a connector that is releasably coupled to the port.

23. The faucet of claim 22, wherein the processor and the port are mounted to the printed circuit board.

24. The faucet of claim 23, wherein the valve assembly includes an outer housing having an opening, the printed circuit board and the electrically operable valve are positioned in the outer housing, and the port is accessible through the opening of the outer housing.

25. The faucet system of claim 18, wherein the controller is operably coupled to a power source for powering the electronic faucet, and the controller powers the electronics of the secondary dispensing device from the power source via the port.

26. The faucet system of claim 18, wherein the secondary dispensing device includes at least one of a soap dispenser and a beverage dispenser.

27. The faucet system of claim 18, wherein the secondary dispensing device includes an electronic faucet.

* * * * *